No. 776,085. PATENTED NOV. 29, 1904.
C. H. REPATH & F. E. MARCY.
RABBLE ARM AND RAKE.
APPLICATION FILED MAR. 14, 1904.
NO MODEL.
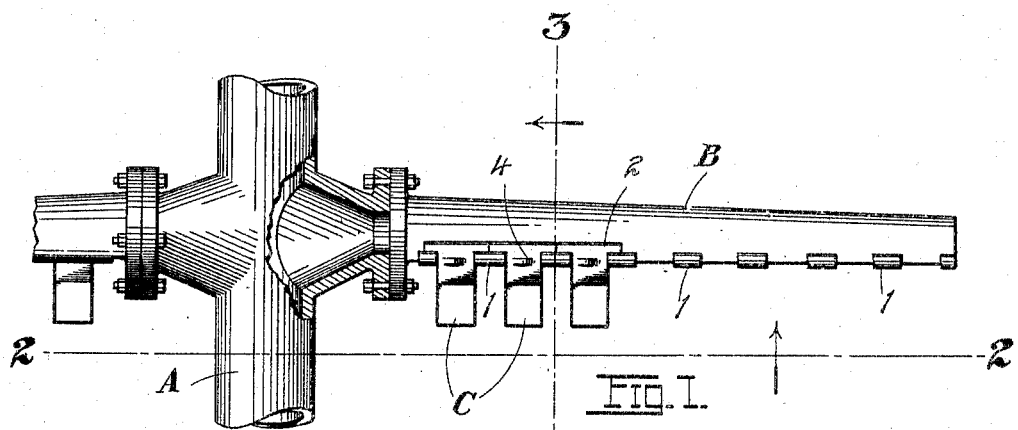
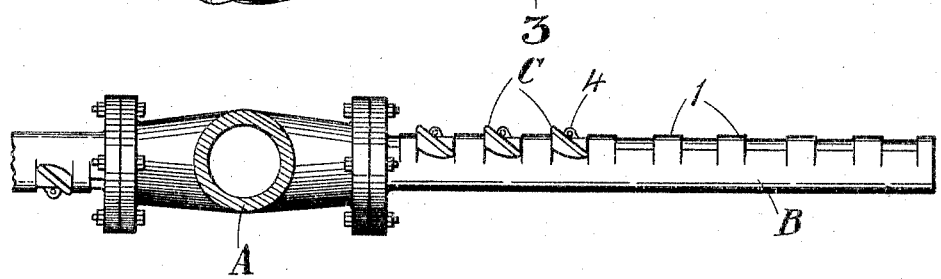
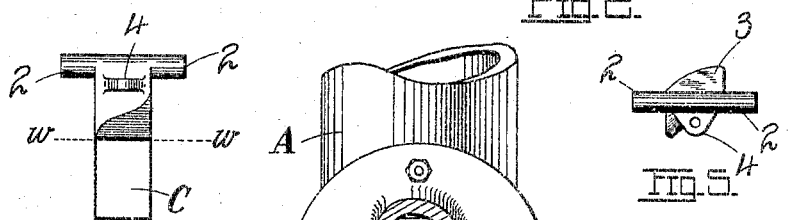
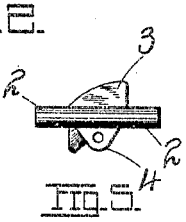
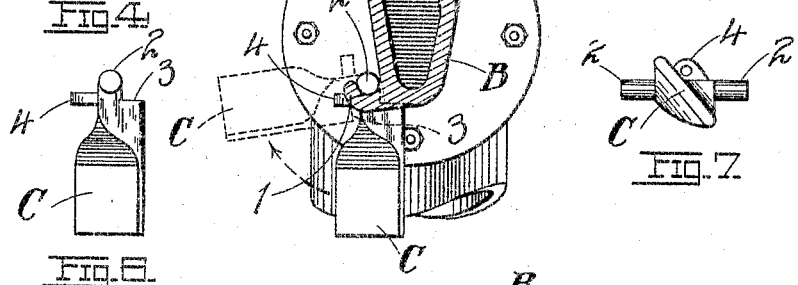
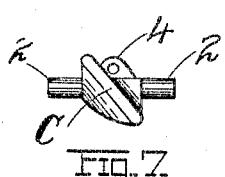
WITNESSES:
INVENTORS
Charles H. Repath
Frank E. Marcy
BY
ATTORNEY.

No. 776,085. Patented November 29, 1904.

UNITED STATES PATENT OFFICE.

CHARLES H. REPATH AND FRANK E. MARCY, OF NEW YORK, N. Y., ASSIGNORS TO FRANK KLEPETKO, OF NEW YORK, N. Y.

RABBLE-ARM AND RAKE.

SPECIFICATION forming part of Letters Patent No. 776,085, dated November 29, 1904.

Application filed March 14, 1904. Serial No. 198,086. (No model.)

*To all whom it may concern:*

Be it known that we, CHARLES H. REPATH and FRANK E. MARCY, citizens of the United States, residing at New York, in the county of New York and State of New York, have invented certain new and useful Improvements in Rabble-Arms and Rakes, of which the following is a full, clear, and exact description, reference being had to the accompanying drawings, forming a part hereof.

Our invention has relation to improvements in rabble-arms and rakes for roasting-furnaces; and it consists in the novel construction and arrangement of parts more fully set forth in the specification and pointed out in the claims.

In the drawings, Figure 1 is an elevation of a rabble-arm looking toward the advancing face thereof, showing a number of rakes attached thereto. Fig. 2 is a bottom plan view, the shaft carrying the rabble-arm being in section on line 2 2 of Fig. 1. Fig. 3 is a transverse vertical section on line 3 3 of Fig. 1, showing also by dotted lines the detachable position of the rake or the angle through which it is preferably swung for purposes of removal from the arm. Fig. 4 is a front elevation of one of the rakes. Fig. 5 is a top plan view. Fig. 6 is an edge view looking to the left of Fig. 4. Fig. 7 is an inverted bottom plan looking squarely against the lower edge of the rake, and Fig. 8 is a perspective view of the hooked bar by which the rake is picked up while being inserted into position on the rabble-arm or removed therefrom.

The present invention is applicable to any class of roasting-furnace in which rabble-arms provided with rakes or blades are employed for stirring the ore during the roasting operation. These furnaces may be either the turret or McDougall type or the straight-line furnace, such as the Ropp or Wethey.

The object of the invention is to overcome objections inherent in the prevailing constructions of rabble-arms and rakes, the most conspicuous of which is the practical impossibility of removing a rake from a rabble-arm should occasion for such a removal arise, as it sooner or later does when such rake becomes broken or is rendered unserviceable for other causes.

Heretofore the rakes have been secured to the rabble-arms by rivets, bands, bolts, and set-screws, all of which either become loose or they become corroded by the action of the sulfurous gases from the charge and tightly cemented to the rabble-arm. In other cases the rakes have been strung by a series of engaging lips over suitable flanges formed on the rabble-arms for purposes of making the removal of any rake easy in the event it becomes broken and a new one must be substituted therefor; but even this construction has its drawbacks for the reason that the lips of the rakes become cemented to the flanges of the rabble-arms, and when it becomes necessary to replace a broken rake the entire series thus cemented must be chiseled or broken off their supporting-flanges in order to permit the new rake to be mounted in proper position, and in the removal of the good rakes several of these may become broken, so that it causes the original break to be multiplied many times. So, too, must the furnace be stopped and allowed to cool to make such a repair.

With our present invention any rake when broken can be removed and a new one substituted therefor without the necessity of disturbing the good rakes and without the necessity of first cooling the furnace to make the repair.

The character of rabble-arm to which the present rake is attached is immaterial, be the same water or air cooled, or be it neither of these, so long as it possesses the details which are essential to effect a coupling with the specific form of rake forming the subject-matter of the present invention.

In detail the invention may be described as follows, the rake being preferably shown in connection with a rabble-arm as used in the turret or McDougall type of roasting-furnace.

Referring to the drawings, A represents a section of a vertical rotatable hollow shaft, to which the several hollow rabble-arms B are attached. The rabble-arms are made of cast-iron, and in the present instance are of a crosssection, preferably, as shown in Fig. 3. For convenience we shall denominate as the "advancing" face or wall of the rabble-arm the side which faces the direction of motion or rotation to which the arm is subjected during the raking operation. It corresponds to the vertical face from which the rakes are suspended.

Disposed along the lower edge of the advancing face of each rabble-arm are a series of suitably-spaced upwardly-turned curved hooks or flanges 1, which collectively form a groove or depression for the support of the trunnions or arms 2 of the rakes or blades C, the body of each blade being disposed in a plane making the proper angle with the axis of suspension of the blade in order to not only agitate the ore on the hearth over which the rabble-arm revolves, but to direct the ore radially (in proper direction) to effect the necessary discharge thereof from one hearth to the next hearth below, all as fully understood in furnaces of the turret or McDougall type. The position of the center of gravity of each rake is such that if left freely suspended from its trunnions 2 it will assume a substantially vertical position, being limited thereto by the shoulder 3, formed in the rear of the blade and below the axis of suspension thereof, said shoulder coming squarely against the under surface of the rabble-arm, Fig. 3, and arresting the rake against any further oscillation rearwardly. As thus suspended, no upward thrust can possibly dislodge the rake, for the shoulder 3 being braced against the rabble-arm will resist such thrust, and no horizontal thrust against the advancing face of the rake can dislodge it on account of the upturned flange 1, which partially envelops the periphery of the trunnion 2. Thus the rake can neither be lifted in the plane of its suspension nor dislodged by any force acting against the front or advancing face of the rake. The latter can, however, be readily detached if swung forward through an angle sufficient to enable the shoulder 3 to clear the base of the arm B (see dotted position of rake in Fig. 3) when the rake can be readily lifted from the arm and as readily placed back again.

The weakest part of each rake is along the line $w\ w$, Fig. 4, so that if for any cause the rake is caught it can break along this line and no damage will be done to the arm A or the flanges 1 from which the rake is suspended. In renewing such a broken rake the operator uses a hooked bar R, the hooked end of which he inserts into a perforated lug or loop 4, formed at the upper end of the front face of the rake, thus picking up the rake and placing the same into position on its supporting-flanges, the broken rake being first removed in the same manner. Thus a repair can be effected without the necessity of cooling the furnace or tampering with any of the rakes which are still in good condition. Of course the insertion of the hook of the bar R into the loop or perforated lug 4 enables the workman to swing the rake to the proper angle (substantially ninety degrees) to allow the shoulder 3 to clear the bottom of the rabble-arm, both for purposes of removing a broken rake or inserting a new one.

While the flanges 1 1 are here shown formed integral with the rabble-arm, it is apparent that they might be detachable therefrom or carried by an independent plate secured to the rabble-arm, as is obvious. The flanges 1 1 are spaced just sufficiently apart to allow for the body of the blade to swing freely between their adjacent ends, as clearly seen in the drawings.

We do not of course wish to be limited to the precise details here shown, as they may in a measure be departed from without in any wise affecting the nature or spirit of our invention.

Having described our invention, what we claim is—

1. The combination with a rabble-arm, of a rake pivotally suspended therefrom and adapted to be held rigid by said arm upon advance of the latter in one direction, the rake being detachable when swung to a suitable distance from the arm, substantially as set forth.

2. The combination with a rabble-arm of a rake pivotally suspended from and bearing against the arm, and being detachable therefrom upon oscillation thereof through a suitable angle from its plane of suspension, substantially as set forth.

3. The combination with a rabble-arm of a rake pivotally suspended from and locked against the arm, and removable therefrom upon oscillation through a suitable angle from its plane of suspension, substantially as set forth.

4. The combination with a rabble-arm of a rake having hinge-arms for the pivotal suspension thereof from said arm, and a shoulder adapted to bear against the arm and lock the rake against movement upon an advance of said rabble-arm in one direction, substantially as set forth.

5. The combination with a rabble-arm having a series of suitably-spaced curved flanges disposed along the advancing side thereof, of rakes disposed in the spaces between the flanges, said rakes having arms resting on the flanges on either side of the spaces for the hinged suspension of the rakes, and shoulders for bearing against the under side of the arm and locking the rakes against movement with the advance of said arm, substantially as set forth.

6. A rabble-arm having a rake pivotally suspended therefrom and locked thereto against vertical movement, the rake being detachable from the arm when swung through a suitable angle from its plane of suspension, substantially as set forth.

7. A rabble-arm having a rake pivotally suspended therefrom and locked thereto, the rake being detachable from said arm when swung through a suitable angle from its plane of suspension, substantially as set forth.

8. A rake comprising a body portion or blade, terminal arms or trunnions from which the same may be pivotally suspended, and a rear shoulder disposed below the axis of suspension for engaging the rabble-arm carrying the same, substantially as set forth.

9. A rake comprising a body portion or blade, terminal cylindrical arms or trunnions extending beyond the sides of the blade and at an angle thereto, and a rear shoulder disposed below the suspension-axis of the rake for engaging the rabble-arm carrying the same, substantially as set forth.

10. A rake comprising a body portion or blade, terminal cylindical arms or trunnions extending beyond the sides of the blade and at an angle thereto, a rear shoulder disposed below the suspension-axis of the rake for engaging the rabble-arm, and a perforated lug for picking up the rake, substantially as set forth.

11. A rabble-arm provided with rakes pivotally suspended therefrom and locked therewith, and liftably removable therefrom upon being swung out of the plane of such suspended position, substantially as set forth.

12. A rabble-arm provided with rakes loosely and pivotally suspended therefrom and locked therewith against an upward thrust, and liftably removable therefrom when swung out of the plane of their suspended position, substantially as set forth.

13. A rabble-arm having a series of suitably-spaced flanges, and rakes pivotally suspended between said flanges and supported by them, substantially as set forth.

In testimony whereof we affix our signatures in presence of two witnesses.

CHAS. H. REPATH.
FRANK E. MARCY.

Witnesses:
M. A. PESTANA,
M. E. RUTLEDGE.